(12) United States Patent
Choiniere et al.

(10) Patent No.: US 9,753,242 B2
(45) Date of Patent: Sep. 5, 2017

(54) OPTICAL BENCH ASSEMBLY

(71) Applicant: BAE SYSTEMS INFORMATION AND ELECTRONIC SYSTEMS INTEGRATION INC., Nashua, NH (US)

(72) Inventors: Michael J. Choiniere, Merrimack, NH (US); Egor V. Degtiarev, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 402 days.

(21) Appl. No.: 14/552,509

(22) Filed: Nov. 25, 2014

(65) Prior Publication Data

US 2015/0146428 A1 May 28, 2015

Related U.S. Application Data

(60) Provisional application No. 61/909,684, filed on Nov. 27, 2013.

(51) Int. Cl.

| | |
|---|---|
| *G02B 27/20* | (2006.01) |
| *G02B 7/00* | (2006.01) |
| *G02B 7/18* | (2006.01) |
| *F21V 15/01* | (2006.01) |
| *F21Y 115/30* | (2016.01) |
| *F21Y 115/10* | (2016.01) |

(52) U.S. Cl.
CPC .............. *G02B 7/008* (2013.01); *F21V 15/01* (2013.01); *G02B 7/181* (2013.01); *F21Y 2115/10* (2016.08); *F21Y 2115/30* (2016.08)

(58) Field of Classification Search
CPC ................................ F21V 7/0008; F21V 5/00
See application file for complete search history.

(56) References Cited

U.S. PATENT DOCUMENTS

| | | | | |
|---|---|---|---|---|
| 5,036,439 | A * | 7/1991 | Hoffmann | F21S 48/1109 313/113 |
| 2002/0085598 | A1* | 7/2002 | Shaw | G02B 6/4201 372/36 |
| 2005/0244111 | A1* | 11/2005 | Wolf | G02B 6/4214 385/93 |
| 2006/0076483 | A1* | 4/2006 | Scheidemann | H01J 49/02 250/289 |
| 2012/0223255 | A1* | 9/2012 | Walker | B64F 1/20 250/495.1 |

* cited by examiner

*Primary Examiner* — Evan Dzierzynski
(74) *Attorney, Agent, or Firm* — Global IP Services, PLLC

(57) ABSTRACT

An optical bench assembly is disclosed. In one embodiment, the optical bench assembly includes a housing and a cantilever optical bench for holding optical components. Further, the cantilever optical bench includes a front flange coupled to the housing and an optical bench attached to the front flange such that the optical bench is not susceptible to movements of the housing due to varying ambient conditions and resulting loads.

7 Claims, 3 Drawing Sheets

OPTICAL BENCH ASSEMBLY

CROSS-REFERENCE TO RELATED APPLICATIONS

This Application claims rights under 35 USC §119(e) from U.S. application Ser. No. 61/909,684 filed Nov. 27, 2013, the contents of which are incorporated herein by reference.

BACKGROUND OF THE INVENTION

Field of the Invention

The present invention relates to optical bench assembly and more particularly to a cantilever optical bench for the optical bench assembly.

Brief Description of Related Art

Typically, a laser system employs an optical bench on which optical components, such as mirrors, polarizers, laser diodes, laser medium and so on are mounted. Exemplary laser system includes laser range finder (LRF), infrared (IR) marker and the like. Typically, the optical bench is hard mounted to bottom of a housing (that also serves as a chassis) for support. Generally, kinematic mounts are used to tie the optical bench to the housing in various degrees of freedom. During operation, the housing endures severe loads created due to different ambient conditions and loads, such as environmental conditions, temperature variations, vibrations, solar loadings, varying pressure loads, and so on. Such ambient conditions and loads may result in flexing the housing. The loads may then be transferred in part onto the optical bench. Due to the transferred loads, the optical bench may deform, bend and/or twist from its original shape, thereby detuning the alignment of the optical components.

SUMMARY OF THE INVENTION

An optical bench assembly is disclosed. According to one aspect of the present subject matter, the optical bench assembly includes a housing and a cantilever optical bench for holding optical components. Further, the cantilever optical bench includes a front flange coupled to the housing and an optical bench attached to the front flange such that the optical bench is not susceptible to movements of the housing due to varying ambient conditions and resulting loads.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

A laser system, such as laser range finder (LRF), infrared (IR) marker and the like employs an optical bench on which optical components (e.g., polarizers, mirrors, laser medium and a laser diode) are mounted. The optical bench is hard mounted to bottom of a housing (which also serves as a chassis) for support. During operation, temperature gradients induced into one side of the chassis may result in thermal gradient asymmetry in structure of the laser system. This thermal gradient may result in twisting and bending of the optical bench. Further, heat generated by the laser diode mounted on the optical bench may increase the thermal load on the optical bench. In an example, a 4 inch long chassis with a 1 degree gradient may induce a wall stretch of about 100μ inches relative to a cool wall. This may result in a 100 μrads angle misalignment between the optical components. This may be sufficient to detune the laser.

To eliminate the misalignment issues, some systems/methods tie the optical bench to the housing using a three point mounting scheme with flexures to compensate housing movements (e.g., housing movements introduced due to temperature variation, vibration, solar loadings and varying pressure loads). This technique decouples the housing from the optical bench. However, this may be expensive. Further, this may affect laser boresight and provide a thermal conductive path between the housing and the optical bench.

The example technique disclosed herein provides an optical bench assembly. In an example embodiment, the optical bench assembly includes a housing and a cantilever optical bench for holding the optical components. Further, the cantilever optical bench includes a front flange coupled to the housing and an optical bench attached to the front flange such that the optical bench is not susceptible to movements of the housing due to varying ambient conditions and resulting loads. This technique eliminates asymmetric forces on the optical bench that are introduced during assembly and thermal gradients during operation. Further, the optical bench is coupled to the housing at one point (by the front flange) making it impossible to twist, bend and force the optical bench to misalign. Furthermore, this technique enables mounting of the laser diode on the housing to reduce the thermal gradients.

Figure 1:
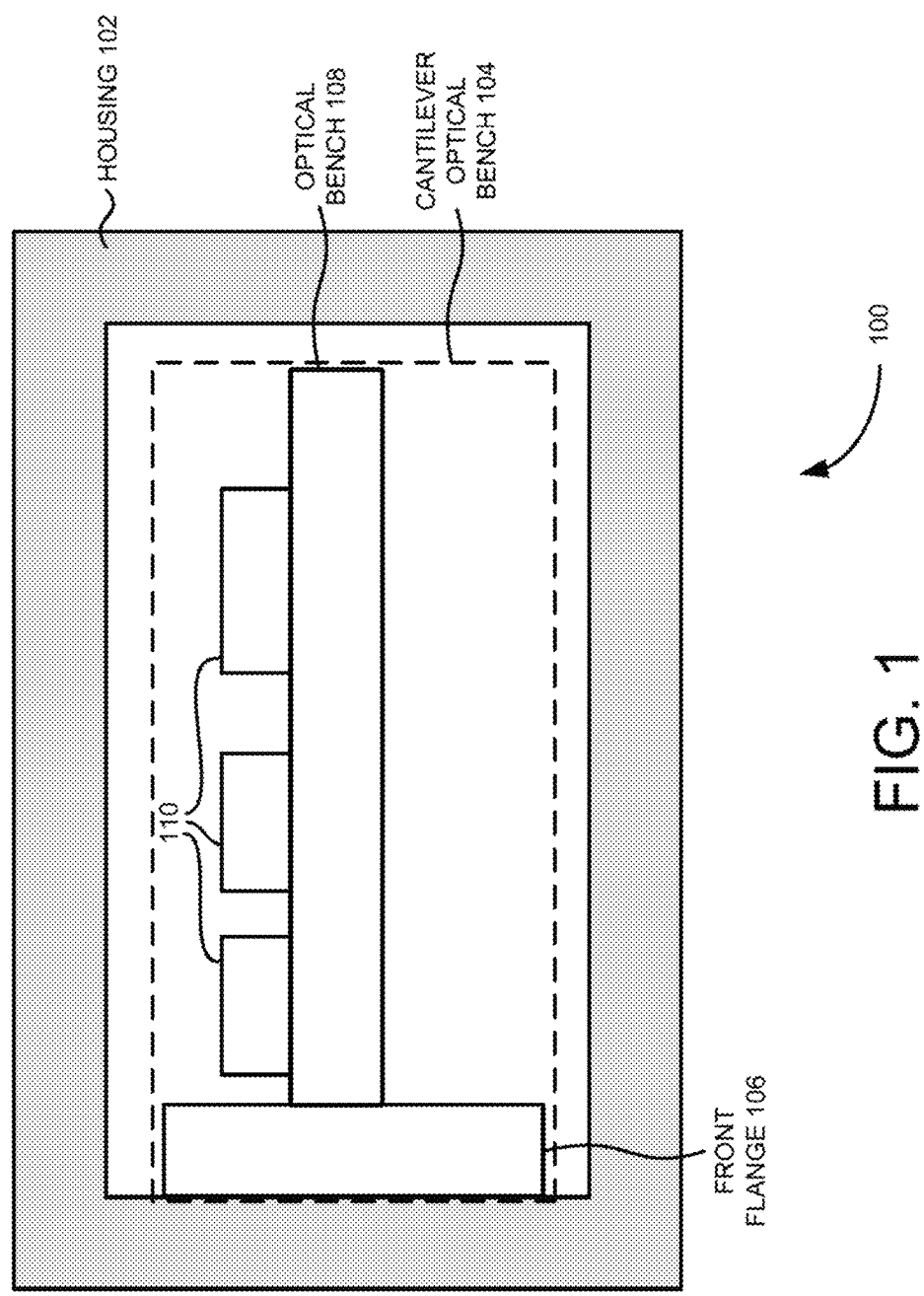
FIG. 1 illustrates a cross-sectional view of an exemplary optical bench assembly, according to an embodiment.

Referring now to FIG. 1, which illustrates a cross-sectional view of an exemplary optical bench assembly 100, according to an embodiment. As shown in FIG. 1, the optical bench assembly 100 includes a housing 102. Further as shown in FIG. 1, the housing 102 includes a cantilever optical bench 104. The housing 102 is a box enclosing the cantilever optical bench 104.

Furthermore as shown in FIG. 1, the cantilever optical bench 104 includes a front flange 106 and an optical bench 108. In one embodiment, the front flange 106 is coupled to the housing 102 and the optical bench 108 is attached to the front flange 106 only at one end. In this embodiment, the optical bench 108 is substantially isolated (or uncoupled) from the housing 102 such that the optical bench 108 is not susceptible to movements of the housing 102. For example, the movements may be generated during assembly and/or operation of the optical bench assembly 100 due to varying ambient conditions, such as environmental conditions, temperature variations, vibrations, solar loadings, varying pressure loads, and so on. Furthermore as shown in FIG. 1, optical components 110 are mounted on the optical bench 108. Exemplary optical components include mirrors, polarizers, a laser medium and the like, shown in FIG. 3.

In an example embodiment, a light source is attached to the housing 102. Exemplary light source includes a laser diode (e.g., a laser diode 314 shown in FIG. 3). A laser diode is a semiconductor device that produces coherent radiations in the visible or IR spectrum when current passes through it. In this example, heat generated from the laser diode is dissipated into the housing 102. Since the heat is not in direct contact with the optical bench 108, impact of thermal gradients introduced into the optical bench 108 is reduced. Further, predominant thermal gradient may be generated along the length of the optical bench 108. The thermal conductivity of the optical bench 108 and the front flange 106 that acts as a thermal sink drives the thermal gradients along the length of the optical bench 108. This may increase the spacing between the optical components. However, alignment of the optical components 110 will not be affected.

Figure 2:
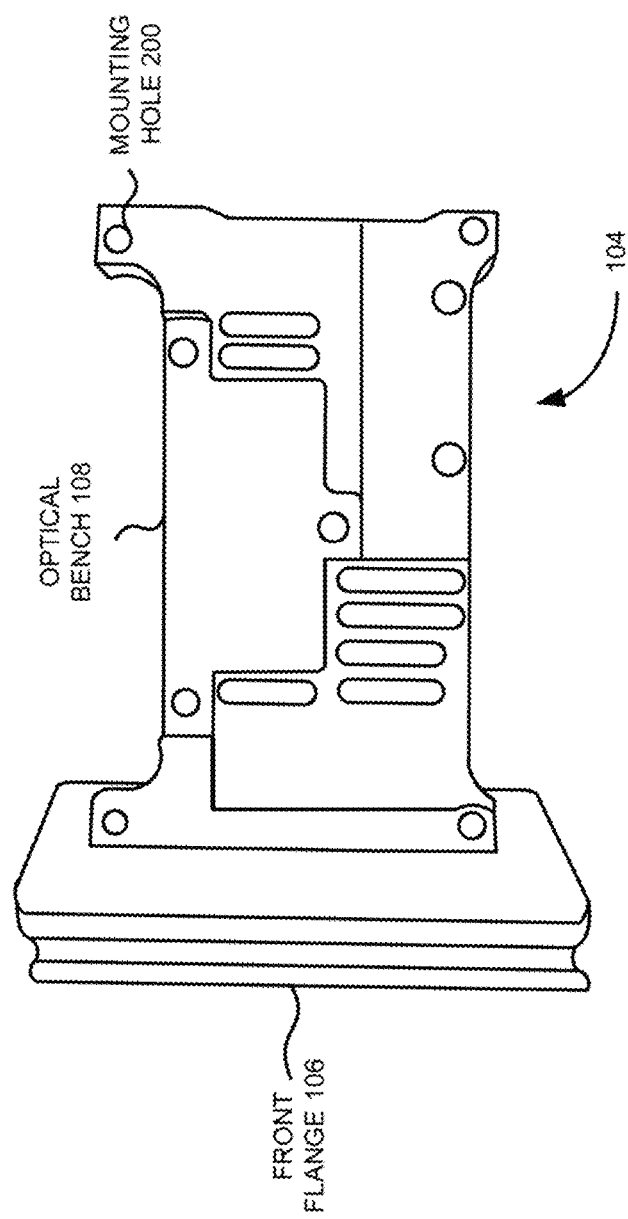
FIG. 2 illustrates a top view of an exemplary cantilever optical bench, according to an embodiment.

Referring now to FIG. 2, which illustrates top view of the cantilever optical bench 104, according to an embodiment. As shown in FIG. 2, the optical bench 108 includes mounting holes (e.g., mounting hole 200) for mounting the optical components. Exemplary optical components mounted on the optical bench 108 are illustrated in FIG. 3.

Figure 3:
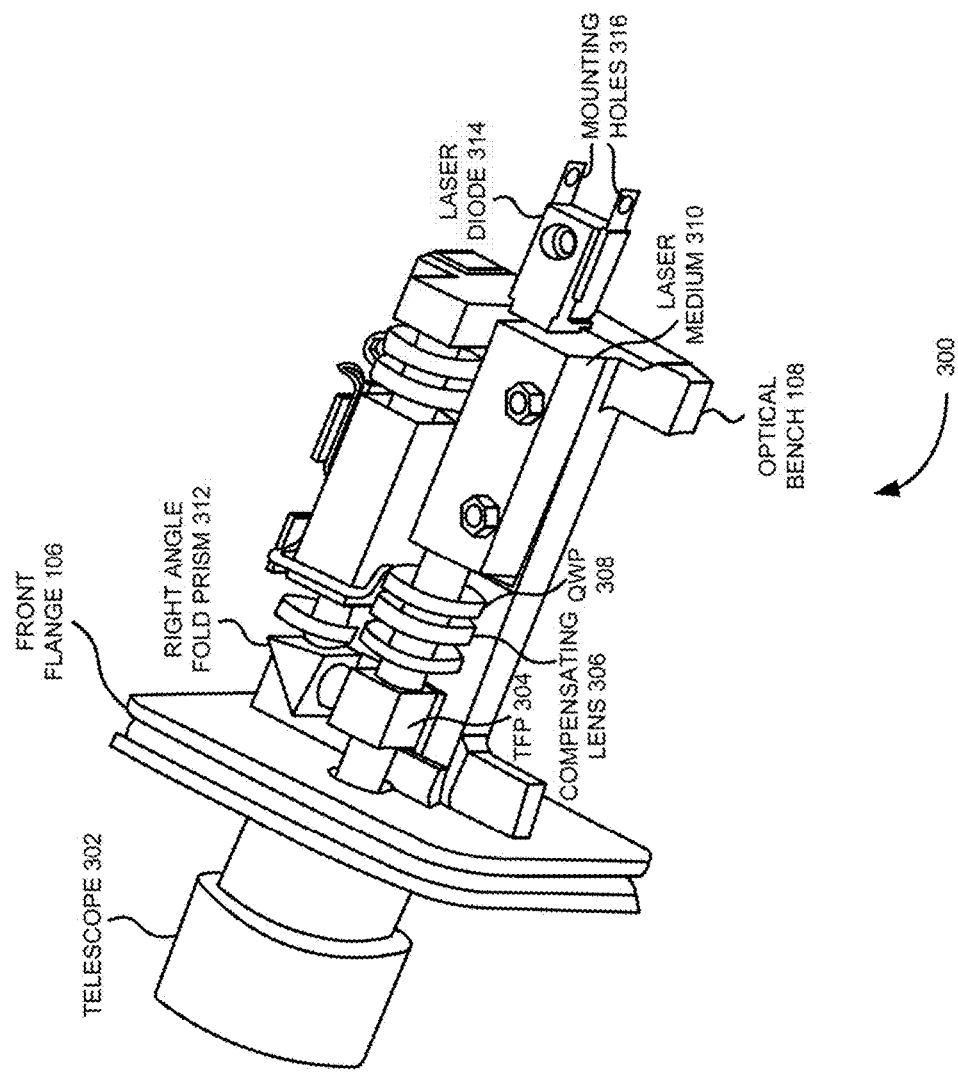
FIG. 3 illustrates an exemplary laser system including the cantilever optical bench, such as those shown in FIGS. 1 and 2, holding optical components, according to an embodiment.

Referring now to FIG. 3, which illustrates a laser system 300 including the cantilever optical bench 104, such as those shown in FIGS. 1 and 2, holding optical components, according to an embodiment. As shown in FIG. 3 the laser system 300 includes the front flange 106 attached to the optical bench 108. Further, optical components, such as a thin film polarizer (TFP) 304, compensating lens 306, quarter wave plate (QWP) 308, laser medium 310 (e.g., a neodymium-doped yttrium aluminium garnet (Nd:YAG) laser medium) and a right angle fold prism 312 are mounted on the optical bench 108. Further as shown in FIG. 3, a telescope 302 is attached to the front flange 106.

Furthermore as shown in FIG. 3, a laser diode 314 is positioned in front of the laser medium 310. In addition as shown in FIG. 3, the laser diode 314 includes mounting holes 316 to fix the laser diode 314 to the housing (e.g., the housing 102 shown in FIG. 1). In one example, when the cantilever optical bench 104 is inserted into the housing 102, the laser medium 310 is positioned in front of the laser diode 314 with approximately around 0.01 inch gap. Therefore, heat produced by the laser diode 314 goes into the housing 102 and not the optical bench 108.

In various embodiments, the systems and methods described in FIGS. 1 through 3 propose an optical bench assembly including a cantilever optical bench. The cantilever optical bench includes a stout optical bench tied at one end which cannot twist, bend or deform due to loading on housing. Further, the compact optical bench is not affected by shock and vibration due to its stubby nature. Further, the cantilever optical bench stabilizes the alignment of the optical components over harsh environments and provides a consistent laser power over temperature variations.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An optical bench assembly, comprising:
   a housing having a first end and a second end;
   a laser diode attached to the outside of the housing at the second end, the laser diode being configured to produce a resultant beam; and
   a cantilever optical bench having a first end and a second end for mounting optical components, wherein the cantilever optical bench includes: a flange attached to the first end of the cantilever optical bench used to couple the cantilever optical bench to the first end of the housing; the cantilever optical bench being attached to the housing via the flange on the first end of the cantilever optical bench such that the cantilever optical bench and the flange are enclosed by the housing, but the cantilever optical bench is only attached at the first end such that any heat generated by the laser diode attached to the outside of the second end of the housing is dissipated into the housing and not transferred to the cantilever optical bench and where any heat generated by optical components mounted to the cantilever optical bench results in a predominant thermal gradient in the cantilever optical bench extending along a length of the cantilever optical bench such that the resultant beam is not susceptible to movements of the housing and will remain in alignment.

2. The optical bench assembly of claim 1, wherein the optical components are selected from the group consisting of mirrors, polarizers and a laser medium.

3. The optical bench assembly of claim 1, wherein the resultant beam remaining in alignment is defined by having an angle misalignment between the optical components of less than 100 µradians.

4. An optical bench assembly, comprising:
   a housing having a first end and a second end;
   a laser diode attached to the housing at the second end and being configured to produce a resultant beam; and
   a cantilever optical bench having a first end and a second end for mounting optical components, wherein the optical components are selected from the group consisting of mirrors, polarizers and a laser medium and wherein the cantilever optical bench includes: a flange attached to the first end of the cantilever optical bench used to couple to the first end of the housing; the cantilever optical bench being attached to the first end of the housing via the flange attached to the first end of the cantilever optical bench such that the optical bench is not susceptible to movements of the housing due to vibrations or thermal expansion in the housing resulting from any heat generated by the laser diode attached to the second end of the housing dissipating into the housing and where any heat generated by components mounted to the optical bench results in a predominant thermal gradient in the optical bench extending along a length of the optical bench such that the resultant beam will remain in alignment.

5. The optical bench assembly of claim 4, wherein the resultant beam remaining in alignment is defined by having an angle misalignment between the optical components of less than 100 µradians.

6. An optical bench assembly, comprising:
   a housing having a first end and a second end;
   a cantilever optical bench for mounting optical components, wherein the optical components are selected from the group consisting of mirrors, polarizers and a laser medium and wherein the cantilever optical bench has a first end and a second end and includes:

a flange for coupling the first end of the cantilever optical bench to the first end of the housing; the cantilever optical bench being attached only to the flange such that the cantilever optical bench is not susceptible to movements of the housing; and a laser diode attached to the inside of the second end of the housing and spaced apart from a laser medium attached to the cantilever optical bench such that any heat generated by the laser diode attached to the inside of the second end of the housing is dissipated into the housing and not transferred to the optical bench and any heat generated by the optical components mounted to the cantilever optical bench results in a predominant thermal gradient in the cantilever optical bench extending along a length of the optical bench such that the resultant beam will remain in alignment.

7. The optical bench assembly of claim 6, wherein the resultant beam remaining in alignment is defined by having an angle misalignment between the optical components of less than 100 μradians.

* * * * *